United States Patent
Raav et al.

(10) Patent No.: US 7,225,701 B2
(45) Date of Patent: Jun. 5, 2007

(54) LOCKING DEVICE HAVING AN ACTUATING LEVER FOR AN ADJUSTABLE STEERING COLUMN

(75) Inventors: Stefan Raav, Braunschweig (DE); Daniel Schikora, Büddenstedt (DE); Jens-Peter Schnick, Braunschweig (DE); Harald Gerloff, Königslutter (DE); Jörg Laue, Isenbüttel (DE); Michael Werner, Mariental (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 141 days.

(21) Appl. No.: 10/782,324

(22) Filed: Feb. 19, 2004

(65) Prior Publication Data

US 2004/0159174 A1 Aug. 19, 2004

Related U.S. Application Data

(63) Continuation of application No. PCT/EP02/07772, filed on Jul. 12, 2002.

(30) Foreign Application Priority Data

Aug. 21, 2001 (DE) .................................. 101 41 010

(51) Int. Cl.
   *B62D 1/18* (2006.01)
(52) U.S. Cl. .......................................... 74/493; 280/777
(58) Field of Classification Search ................ 280/775, 280/777, 730.1; 296/187.05, 187.09, 70, 296/74, 152; 74/492, 493, 512, 523, 543–551
   See application file for complete search history.

(56) References Cited

U.S. PATENT DOCUMENTS

| 3,561,281 | A | * | 2/1971 | Wilfert | 74/473.3 |
|---|---|---|---|---|---|
| 3,750,492 | A | * | 8/1973 | Holmes, Jr. | 74/523 |
| 3,760,651 | A | * | 9/1973 | Roseby | 74/523 |
| 3,795,156 | A | * | 3/1974 | Neuscheler | 74/523 |
| 4,009,623 | A | * | 3/1977 | Smith et al. | 74/512 |
| 4,022,495 | A | * | 5/1977 | Pizzocri | 280/750 |
| 4,228,695 | A | * | 10/1980 | Trevisson et al. | 74/492 |
| 4,927,174 | A | * | 5/1990 | Jones | 280/777 |
| 5,141,248 | A | * | 8/1992 | Haldric et al. | 280/777 |
| 5,470,107 | A | * | 11/1995 | Muntener et al. | 280/777 |
| 5,531,317 | A | * | 7/1996 | Tomaru | 280/775 |
| 5,593,183 | A | * | 1/1997 | Fouquet et al. | 280/775 |
| 5,992,261 | A | * | 11/1999 | Iwata et al. | 74/473.1 |
| 6,189,405 | B1 | * | 2/2001 | Yazane | 74/493 |

(Continued)

FOREIGN PATENT DOCUMENTS

DE    1 944 173    3/1971

(Continued)

*Primary Examiner*—David M. Fenstermacher

(57) ABSTRACT

A locking device has an actuating lever for an adjustable steering column in a vehicle. The locking device is provided between a mounting fixed on the vehicle and a casing tube. The casing tube surrounds the steering column and can be adjusted relative to the mounting. The actuating lever can be pivoted below and/or to the side of the casing tube between a locking position and a release position for locking and releasing the casing tube. A handle component for the actuating lever is positioned at a given distance from the casing tube when the actuating lever is in the locking position. The actuating lever is configured as a deformation element and, when there is an impact, the handle component can be deformed in a direction toward the casing tube for absorbing energy and protecting the driver.

10 Claims, 3 Drawing Sheets

U.S. PATENT DOCUMENTS

| | | |
|---|---|---|
| 6,264,239 B1 | 7/2001 | Link |
| 6,415,682 B1 * | 7/2002 | Drew .......................... 74/513 |
| 6,439,074 B1 * | 8/2002 | Stencel .................... 74/473.31 |
| 6,755,268 B1 * | 6/2004 | Polz et al. ............... 180/69.12 |
| 6,786,307 B2 * | 9/2004 | Komatsubara et al. ...... 188/2 D |

FOREIGN PATENT DOCUMENTS

| | | |
|---|---|---|
| DE | 1 951 684 | 4/1971 |
| DE | 198 12 179 C1 | 8/1999 |
| WO | WO 00/69704 | * 11/2000 |

* cited by examiner

LOCKING DEVICE HAVING AN
ACTUATING LEVER FOR AN ADJUSTABLE
STEERING COLUMN

CROSS-REFERENCE TO RELATED
APPLICATION

This application is a continuation of copending International Application No. PCT/EP02/07772, filed Jul. 12, 2002, which designated the United States and was not published in English.

BACKGROUND OF THE INVENTION

Field of the Invention

The invention relates to a locking device having an actuating lever for an adjustable steering column in a vehicle, in particular having an actuating lever disposed centrally below the steering column.

A conventional steering column configuration for a motor vehicle has a steering column that is guided in a casing tube, which can be adjusted in tilt or inclination with respect to the vehicle body within a predetermined angular range in a vertical plane, which is determined by its axis.

The steering column can also be displaced in a given range in the axial direction with respect to the casing tube. The casing tube is connected in an articulated manner to a console which is fastened to a crossmember disposed in a region of the dashboard. A locking device for releasably fixing the casing tube in a given inclined and longitudinal position, which is provided within a predetermined area of adjustment, is provided between the console and the casing tube, which is provided below the latter. The locking device has intermeshing clamping disks, a plurality of which are provided fixedly on the casing tube and a plurality of which are provided fixedly on the console and which are operatively connected to a device which brings the disks frictionally into contact with one another or spreads them apart to release the frictional locking state.

For its actuation, this device has an actuating lever which is provided below the steering column. The handle component of the actuating lever, in the locking state, is oriented essentially parallel to the steering column and to the casing tube and is accommodated in a trough in a steering-column cladding. In this case, the steering-column cladding is configured as an energy-absorbing deformation element and is provided with rounded edges and the impact energy introduced during an impact of a vehicle driver's knee can be dissipated to a very substantial extent over the path of deformation which is available, so that the risk of injury to the vehicle driver's knee by an impact against the steering-column cladding is reduced, particularly since, in the normal position of the vehicle driver, the knees are positioned in each case to the side of the steering column and the actuating lever is disposed centrally. In this case, the probability of an impact of this type is low and arises only in the event of a collision having a lateral force component.

SUMMARY OF THE INVENTION

It is accordingly an object of the invention to provide a locking configuration which provides an improved protection for the vehicle driver's knees during an impact.

With the foregoing and other objects in view there is provided, in accordance with the invention, a locking configuration, including:

an adjustable steering column;
a fixed mounting;
a tilt-adjustable casing tube secured on the fixed mounting, the tilt-adjustable casing tube surrounding the adjustable steering column;
a locking device provided between the fixed mounting and the tilt-adjustable casing tube, the locking device having an actuating lever pivotable between a locking position and a release position such that the actuating lever pivots laterally next to or below the tilt-adjustable casing tube and such that the release position is below the locking position;
the locking device having a handle component for the actuating lever, the handle component being disposed at a given distance from the tilt-adjustable casing tube when the actuating lever is in the locking position; and
the actuating lever being configured as a deformation element for absorbing energy wherein the actuating lever is deformable in a crash such that the handle component moves toward the tilt-adjustable casing tube.

In other words, according to the invention, there is provided, a locking device for an adjustable steering column in a vehicle, the locking device having an actuating lever and being formed between a mounting fixed on the vehicle and a casing tube, which is secured on the mounting in a manner enabling its tilt or inclination to be adjusted and which surrounds the steering column, the actuating lever being pivotable below and/or to the side of the casing tube between a locking position and a release position, which is provided below the latter and is intended for releasing the casing tube, and, in the locking position, being provided with a handle component at a distance from the casing tube, wherein the actuating lever is configured as a deformation element and, if there is an impact, is configured such that it can be deformed and absorbs energy with the handle component moving in a direction toward the casing tube.

The invention resides in the fact that, in the case of a locking device for an adjustable steering column in a vehicle, which locking device is formed and disposed between a mounting fixed on the vehicle and a casing tube, which is provided in a manner allowing its tilt or inclination to be adjusted and which encloses the steering column, and has an actuating lever below and/or to the side of the casing tube, and according to the invention makes provision for the actuating lever to be configured as a deformation element and, in an impact, for it to be deformable, absorbing energy, preferably in the direction of the casing tube. In this case, the actuating lever is provided in such a manner that it can be pivoted between a locking position in the vicinity of the casing tube and a release position, which is provided below the locking position (further away from the casing tube) for the casing tube. When the actuating lever is in the release position, it is possible to set any desired tilt of the casing tube, and therefore of the steering column, and, depending on the layout of the steering-column configuration, also to set any desired axial position of the steering column (longitudinally adjustable steering column) within the scope of a predetermined region of adjustment. The actuating lever is provided on its operating side with a handle component and is configured in such a manner that the handle component is situated at a distance from the casing tube even when in the locking position such that a defined deformation space toward the latter is provided. In the event of an impact with a force component acting transversely with respect to the longitudinal direction of the vehicle, for example in an offset crash, there is the risk of one of the vehicle driver's knees impacting against the actuating lever and, in particular, against the downwardly protruding handle component. If there is such an impact with the handle component, the actuating lever can be deformed, absorbing energy, and can be pressed into the deformation space provided toward the casing tube, which reduces the risk of injury for the vehicle occupant.

The layout of the actuating lever as a deformation element can be achieved in a simple manner by the actuating lever being configured in terms of its profile as a bending bar and, in the direction facing away from the casing tube, being angled or even bent in a hook-like manner and being provided in the region of the angled or bent region with a predetermined buckling point, so that, if there is an impact-induced shock, the actuating lever can be bent, absorbing energy, in the direction of the casing tube and can be plastically deformed in particular in the region of the predetermined buckling point. In this case, the actuating lever, which is bent in a hook-like manner, is shaped in such a manner and the predetermined buckling point is provided in such a manner that the handle component is folded toward the actuating lever until it abuts against it. In other words, according to a feature of the invention, the actuating lever has an angled region formed with a predetermined buckling point or the actuating lever has a hook-shaped bent region adjacent the handle component and is formed with a predetermined buckling point at the hook-shaped bent region.

The actuating lever can have a cross section in the manner of a T-section, the central web being provided on the side facing away from the casing tube, or as an alternative to this, can also have a rectangular cross section with a long side of the section directed toward the casing tube. In order to form the predetermined buckling point, in the first embodiment, the central web of the section is essentially cut out, so that the actuating lever has a rectangular cross section at this point. In the second embodiment, the rectangular cross section is reduced at the predetermined breaking point or buckling point. Thus, according to a preferred embodiment of the invention, the actuating lever has a cross-sectional profile that is either a rectangular profile or a T-shaped profile, and the actuating lever has an angled or bent region, the angled or bent region having a reduction in cross section for forming a predetermined buckling point.

The actuating lever is advantageously formed of steel. The handle component is likewise formed from steel sheet, but is provided with a plastic coating and is screwed to the actuating lever. According to a preferred feature of the invention, the actuating lever forms a two-part element and is made of metal, preferably steel, and the handle component has a metal core with a plastic coating and is preferably screwed to the actuating lever.

The locking device and the casing tube are normally surrounded on the passenger-compartment side by a steering-column cladding which is provided with a gripping trough for receiving the handle component. This gripping trough is formed in the direction toward the casing tube and has a recess for guiding the actuating lever through and for making its adjustment movement possible. In this case, the steering-column cladding and the handle component are configured and arranged in such a manner that in the locking position the handle component, on its side facing away from the steering column, ends flush with the steering-column cladding and there are no protruding edges which could pose a risk of injury. The steering-column cladding itself is advantageously also configured as a deformation element, preferably being formed from a deformation foam, and so can be deformed with energy being absorbed. The steering-column cladding together with the actuating lever, including the handle component which is embedded in the cladding, is therefore provided as a configuration which absorbs impact energy in its entirety, which results in an increase in the energy absorption capability and in an improvement in the protection of the vehicle driver.

According to a preferred feature of the invention, there is thus provided a steering-column cladding surrounding the locking device and the tilt-adjustable casing tube; the steering-column cladding having a receiving trough formed therein for accommodating the handle component; and the receiving trough extending in a direction toward the tilt-adjustable casing tube and having a recess formed therein for providing a pass-through for the actuating lever.

According to a further feature of the invention, the steering-column cladding is configured as a deformation element for absorbing impact energy.

According to a further feature of the invention, the handle component has a side facing away from the steering column that is disposed substantially flush with the steering-column cladding when the actuating lever is in the locking position.

According to yet a further feature of the invention, deformation elements are provided between the tilt-adjustable casing tube and the steering-column cladding.

With the objects of the invention in view there is also provided, in combination with a vehicle having an adjustable steering column and having a fixed mounting and a tilt-adjustable casing tube secured on the fixed mounting and surrounding the adjustable steering column, a locking device, including:

an actuating lever pivotable between a locking position and a release position such that the actuating lever pivots laterally next to or below the tilt-adjustable casing tube and such that the release position is below the locking position;

a handle component connected to the actuating lever, the handle component being disposed at a given distance from the tilt-adjustable casing tube when the actuating lever is in the locking position; and the actuating lever being configured as a deformation element for absorbing energy wherein the actuating lever is deformable in a crash such that the handle component moves toward the tilt-adjustable casing tube.

Other features which are considered as characteristic for the invention are set forth in the appended claims.

Although the invention is illustrated and described herein as embodied in a locking device having an actuating lever for an adjustable steering column, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
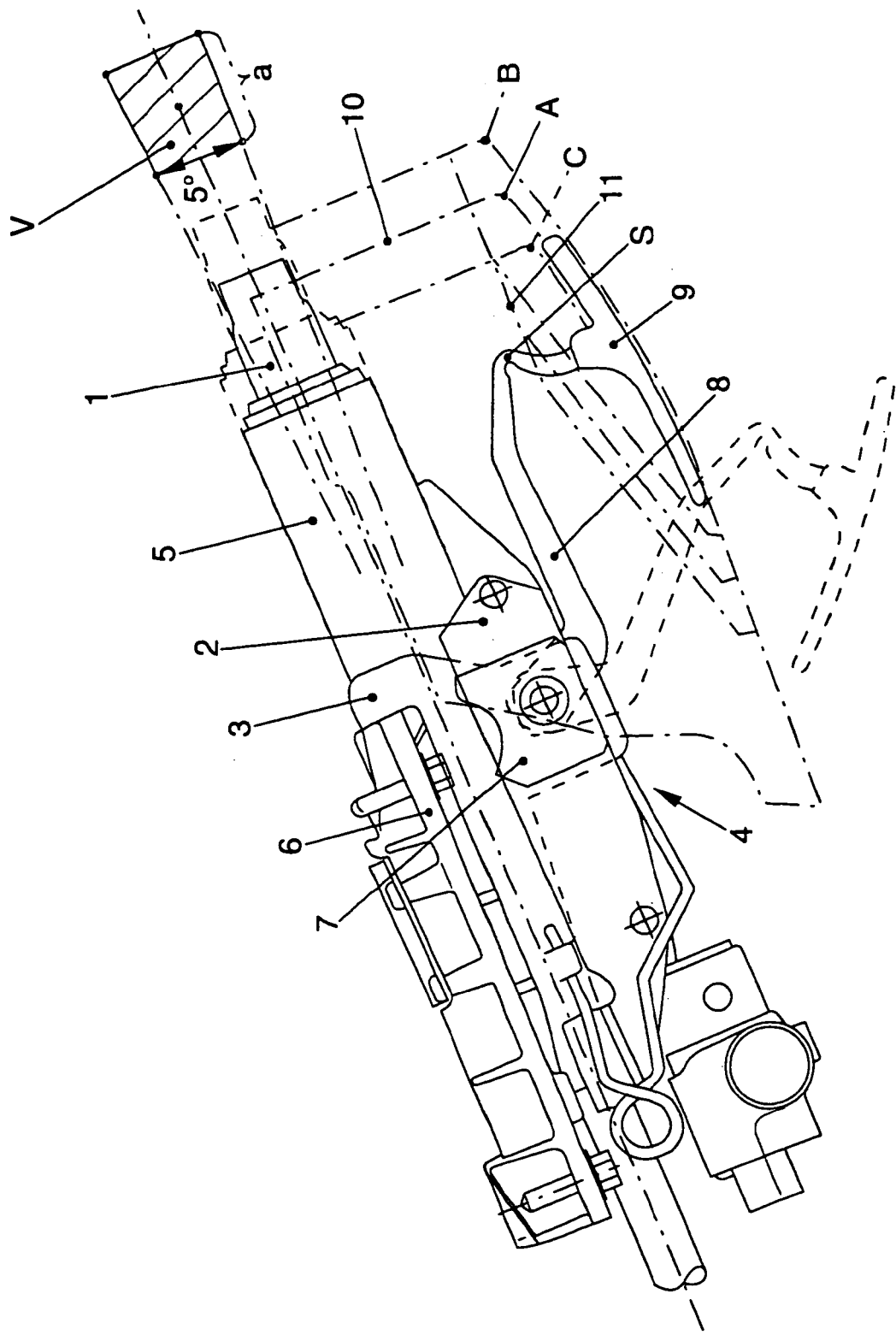
FIG. 1 is a diagrammatic side view of an adjustable steering-column configuration with a locking device according to the invention.

Referring now to the figures of the drawings in detail and first, particularly, to FIG. 1 thereof, there is shown an adjustable steering column 1 for a motor vehicle having a locking device 4 which has intermeshing clamping disks 2 and 3. The clamping disks 2 are arranged in the tangential direction on both sides of a casing tube 5 enclosing the steering column 1. The clamping disks 3 are arranged on a console 6 which is fastened to a main crossmember in the region of the dashboard. The casing tube 5 is arranged in a manner such that it can be pivoted with respect to the console 6 within a narrow angular range (approximately 5°) and, moreover, such that it can be displaced axially, so that the position of the steering column 1 and of a steering wheel to be provided on the latter can be changed. The clamping disks 2 and 3 are operatively connected to a device 7 which either brings them frictionally into abutment against one another or spreads them apart, so that the casing tube 5 is locked together with the steering column 1 in the selected position with respect to the console 6, whereas, in the other case, the clamping disks 2 and 3 are released from each other, with the result that the casing tube 5 can be adjusted with respect to the console 6 as described above. The steering-column configuration in this case is such that the steering column 1 can be changed in position within an adjustment range V which is illustrated, in which case an axial adjustment distance a of up to 50 mm and an adjustment of the angle of inclination of approximately 5° is made possible, which corresponds to a height adjustment distance of approximately 40 mm.

Figure 2:
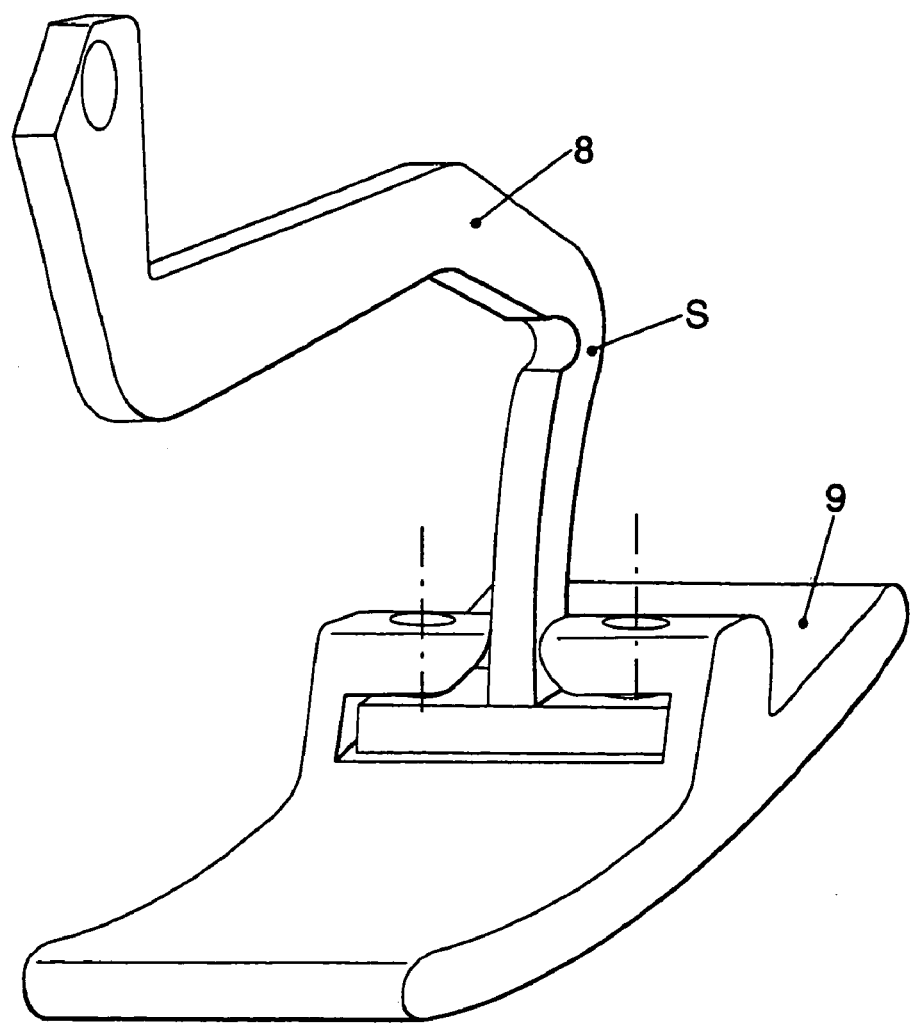
FIG. 2 is an enlarged perspective view of an actuating lever for the locking device of the steering-column configuration according to the invention.

The device 7 has an actuating lever 8 which is disposed centrally and has a rectangular section formed of steel sheet, with a handle component 9 which is formed of a steel sheet core and a plastic casing. The handle component is screwed onto the actuating-side end of the lever. This actuating lever 8, which is illustrated in perspective in FIG. 2, is shown in FIG. 1 by solid lines in its locking position and by dashed lines in a release position, in which the steering column 1 can be adjusted within the range of adjustment V. The actuating lever 8 is bent in a hook-shaped manner on the side of the handle component and is configured as a deformation element. For this purpose a predetermined buckling point S is formed in the region of an angled section wherein the angle is substantially 90° and wherein the buckling point S is provided by a reduction in cross section of substantially 50%.

Figure 5:
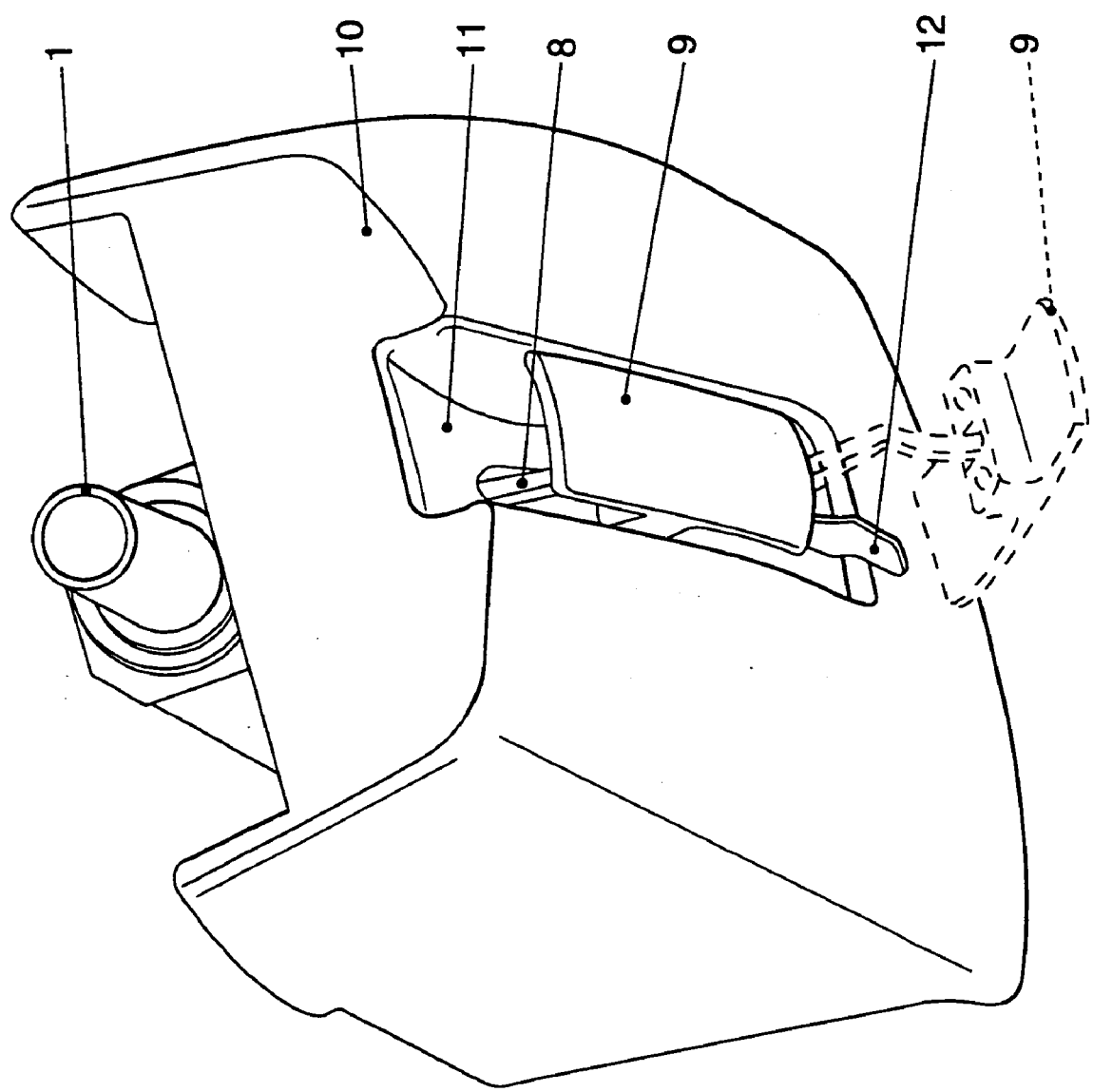
FIG. 5 is a perspective view of a steering-column cladding with the embedded handle component of the actuating lever according to the invention.

The locking device and the casing tube 5 are surrounded by a two-part steering-column cladding, the lower part of which, the lower shell 10, is illustrated in perspective view in FIG. 5 and in dash-dotted lines in FIG. 1 in three longitudinal positions, the central one of which constitutes the starting position A and the positions B and C each representing the final position in the two possible directions of adjustment. The lower shell 10 is connected to the casing tube 5 and is adjusted together with it when the latter is adjusted. The lower shell 10 has a receiving trough 11, which extends toward the casing tube 5 and is intended for receiving the handle component 9. The lower shell 10 has a slot 12 such that the actuating lever 8 can pass through the slot 12 and can pivot in its vertical plane of arrangement. The actuating lever 8 is articulated such that it is fixed on the vehicle, with the result that the actuating lever 8 and the handle component 9 in the receiving trough take up different positions, in each case in the locking position, as a function of the longitudinal adjustment of the casing tube 5. In its locking position, the handle component 9, on its side facing away from the steering column 1, ends flush with the lower shell 10. The latter is configured as a deformation element and is formed of closed-cell PUR (polyurethane) foam with a density of 30 g/l and a decorative outer skin. The deformation distance which is available for the lower shell 10 in the region of the receiving trough 11 in the vertical plane until it abuts against the clamping disks 3 is 40 to 45 mm, depending on the position of the lower shell 10 with respect to the disk assembly of the clamping disks 3. The deformation distance for the handle component 10 arranged on the actuating lever 8 is approximately 50 mm.

If the vehicle driver's knee impacts against the lower shell 10 in the region of the handle component 9, both the lower shell 10 and the actuating lever 8 can be deformed toward the casing tube 5 within the above-described scope with energy being absorbed, the actuating lever 8 being buckled and collapsed in the region of the predetermined buckling point S until the handle component 9 rests against its elongated region.

Figure 3:
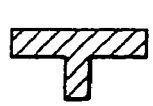
FIGS. 3 and 4 are sectional views of an alternative cross-sectional shape for an actuating lever according to the invention.
Figure 4:
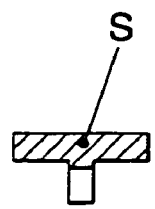

FIGS. 3 and 4 show an alternative cross-sectional form for the actuating lever. The cross section is in the shape of a T-section. The central web is essentially left out in the region of the predetermined buckling point S, so that a rectangular cross section is provided there.

We claim:

1. A locking configuration, comprising:
    an adjustable steering column;
    a fixed mounting;
    a tilt-adjustable casing tube secured on said fixed mounting, said tilt-adjustable casing tube surrounding said adjustable steering column;
    a locking device provided between said fixed mounting and said tilt-adjustable casing tube, said locking device having an actuating lever pivotally mounted about a pivot point between a locking position and a release position laterally next to or below said tilt-adjustable casing tube such that the release position is below the locking position;
    a handle component disposed at a free end of said actuating lever, said handle component being disposed at a given distance from said tilt-adjustable casing tube when said actuating lever is in the locking position; and
    said actuating lever having an angled region formed with a predetermined buckling point between said pivot point and said handle component and being configured as a deformation element for absorbing energy wherein said actuating lever is plastically deformable in a crash such that said handle component moves toward said tilt-adjustable casing tube.

2. The locking configuration according to claim 1, wherein said angled region is a hook-shaped bent region adjacent said handle component.

3. The locking configuration according to claim 1, wherein:
    said actuating lever has a cross-sectional profile selected from the group consisting of a rectangular profile and a T-shaped profile; and
    said angled region having a reduction in cross section for forming a predetermined buckling point.

4. The locking configuration according to claim 1, wherein:
    said actuating lever is formed of metal; and said handle component has a metal core with a plastic coating and is screwed to said actuating lever.

5. The locking configuration according to claim 1, wherein:
said actuating lever is formed of steel;
said handle component has a metal core with a plastic coating; and
said actuating lever and said handle component are connected to one another as a two-part element.

6. The locking configuration according to claim 1, including:
a steering-column cladding surrounding said locking device and said tilt-adjustable casing tube;
said steering-column cladding having a receiving trough formed therein for accommodating said handle component; and
said receiving trough extending in a direction toward said tilt-adjustable casing tube and having a recess formed therein for providing a pass-through for said actuating lever.

7. The locking configuration according to claim 6, wherein said steering-column cladding is configured as a deformation element for absorbing impact energy.

8. The locking configuration according to claim 6, wherein:
said handle component has a side facing away from said steering column; and
said side of said handle component facing away from said steering column is disposed substantially flush with said steering-column cladding when said actuating lever is in the locking position.

9. The locking configuration according to claim 6, including deformation elements provided between said tilt-adjustable casing tube and said steering-column cladding.

10. In combination with a vehicle having an adjustable steering column, a fixed mounting and a tilt-adjustable casing tube secured on the fixed mounting and surrounding the adjustable steering column, a locking device, comprising:
an actuating lever pivotally mounted about a pivot point between a locking position and a release position laterally next to or below the tilt-adjustable casing tube and such that the release position is below the locking position;
a handle component connected to said actuating lever at a free end thereof distal from said pivot point, said handle component being disposed at a given distance from the tilt-adjustable casing tube when said actuating lever is in the locking position; and
said actuating lever having an angled region formed with a predetermined buckling point between said pivot point and said handle component and being configured as a deformation element for absorbing energy wherein said actuating lever is plastically deformable in a crash such that said handle component moves toward the tilt-adjustable casing tube.

* * * * *